United States Patent
DeShon

[11] Patent Number: 5,987,707
[45] Date of Patent: Nov. 23, 1999

[54] BUNGEE CORD SHORTENING DEVICE

[76] Inventor: James Richard DeShon, 2155 Collins Rd., Cresent City, Calif. 95531

[21] Appl. No.: 09/225,562

[22] Filed: Jan. 5, 1999

[51] Int. Cl.$^6$ ................................................ F16G 11/00
[52] U.S. Cl. .................. 24/17 AP; 24/17 AP; 24/129 A; 24/130
[58] Field of Search ............................ 24/129 R, 129 B, 24/129 A, 130, 18, 17 AP, 16 R

[56] References Cited

U.S. PATENT DOCUMENTS

| | | | |
|---|---|---|---|
| 483,771 | 10/1892 | Seymour | 24/130 |
| 630,837 | 8/1899 | Anderson et al. | 24/129 R |
| 749,235 | 1/1904 | Smith | 24/129 R |
| 959,076 | 5/1910 | Scanlon | 24/129 R |
| 986,014 | 3/1911 | Krenzke | 24/130 |
| 1,426,945 | 8/1922 | Anderson | 24/130 |
| 2,418,885 | 4/1947 | Houston | 24/129 B |
| 3,981,500 | 9/1976 | Ryan | 272/85 |
| 4,414,712 | 11/1983 | Beggins | 24/129 R |
| 4,640,212 | 2/1987 | Brandt | 114/230 |
| 4,976,013 | 12/1990 | Wax | 24/129 A |
| 5,094,448 | 3/1992 | Hackett | 272/93 |
| 5,538,382 | 7/1996 | Hasegawa et al. | 414/141 |

*Primary Examiner*—Victor N. Sakran
*Attorney, Agent, or Firm*—Patent & Trademark Services; Thomas Zack; Joseph H. McGlynn

[57] ABSTRACT

A cord retaining device consisting of a T-shaped housing with three legs. Through holes extend through each leg with two of the holes in two legs being aligned with each other. The third or other leg's through hole intersects with the two aligned holes. At the third leg there are two opposite cord retaining grooves that open upwardly and taper downwardly. A bottom slot extends along the length of the two aligned legs and has an enlarged mid portion. By placing a cord having a diameter slightly greater than the diameter of the two aligned housing through holes, such as a bungee cord, through the bottom slot and pulling a mid portion of the cord into the third leg, a loop may be formed by the pulled portion. Lower portions of this formed loop may be inserted into the cord retaining grooves to fix the cord therein. A second bungee cord may also be used with the first bungee cord and housing. In this case, two opposite sides fixed to formed opened spaces in the housing are used to hold the second bungee cord and restrain the movement of the housing with respect to a first bungee cord on which the housing is mounted.

3 Claims, 2 Drawing Sheets

U.S. Patent     Nov. 23, 1999     Sheet 1 of 2     5,987,707

BUNGEE CORD SHORTENING DEVICE

BACKGROUND OF THE INVENTION

Many times it is desirable to have variable length cords without cutting the cord to a shorter length or obtaining various lengths of separate cords. This is particular true when the cord is an elastic stretchable cord such as a bungee cord since the usable effective length can vary depending on the of tensioning force applied.

One very simple solution would be to tie one or more a knots in the cord along its length. This has the disadvantage of having to untie these knots afterwards which may not be an easy affair if the cord had been subjected to considerable tension with the knots tightened on it. Another disadvantage of using knots is that the cord is acting against itself when tensioned thereby subjecting the cord to a certain amount of destructive force.

Another commonly used method to shortening the effective length of a cord is to use a cleat upon which the cord is wound. This cleat is usually fixed to a stationary object, such as a pole or a dock's upright pier, and the cord is wound around the cleat a number of times until the desired effective length is obtained.

A method to adjust the effective rigidity of an elastomer cord involves constructing a cord of an inner elastomer rope with a reinforcement wound helically around the rope that is considerably less elongateable than the elastomeric material and using an outer cover layer of elastomeric material. Under tension changes in the diameters of the elastomer and the reinforcement material are different to permit the desired progressively of the force necessary to produce a definite additional further elongation.

With some bungee or bungee cord systems, a control system using pulleys and cord length adjustors using karabiners have been used. And in a more complicated system a variable level platform suspended from the gantry of a cargo container has been employed to shorten the spreader lift lines.

The present invention differs from the foregoing cord shortening devices by providing for a one piece cord shortening device which provides for both the shortening of the cord and its retention in the shortened state all as more fully explained hereafter.

DESCRIPTION OF THE PRIOR ART

Devices that are capable of shortening and retaining a given length of cord, line or rope are known. For example, in U.S. Pat. No. 3,981,500 to Ryan the length of a rope around a cleat is adjusted by releasing the rope from the cleat, extending the rope the desired length and then re-engaging the rope in the cleat.

In the Brandt reference (U.S. Pat. No. 4,640,212) an elastometer rope with a reinforcement wound helically about the core and consisting of a material considerably less elongateable than the elastomeric material of the core and an outer covering material of elastomeric material. This construction permits the adjustment of the elastometer cord's necessary pull for producing the contemplated additional elongation.

The Hackett patent (U.S. Pat. No. 5,094,448) discloses a bungee jumping system with a cord pulley system and adjustable points of attachment for the cords to compensate for different weights on the cord. Tying the cords to karabiners is used to shorten the length of the cords (column 4, lines 26–38).

And in the Hasegawa et al. invention (U.S. Pat. No. 5,538,382) a variable level platform is disclosed having a pair of scissor jacks with fleet through wire rope for suspending a lifting spreader thereunder whereby the platform effectively shortens the spreader lift lines.

The present invention relates to cord shortening device for a flexible cord having three cord openings, including an opening for the excess cord to be pulled through with side retention elements, and a cord entrance and a cord exit opening all as more fully set forth in this specification.

SUMMARY OF THE INVENTION

This invention relates to a cord shortening device for a flexible cord having three cord openings, including an opening for the excess cord to be pulled through with side retention elements, and a cord entrance and a cord exit opening.

It is the primary object of the present invention to provide for an improved cord shortening device.

Another object is to provide for such a device made of a unitary construction and usable primarily with a stretchable bungee type cord.

These and other objects and advantages of the present invention will become apparent to readers from a consideration of the ensuing description and the accompanying drawings.

DESCRIPTION OF THE PREFERRED EMBODIMENT

Figure 1A:
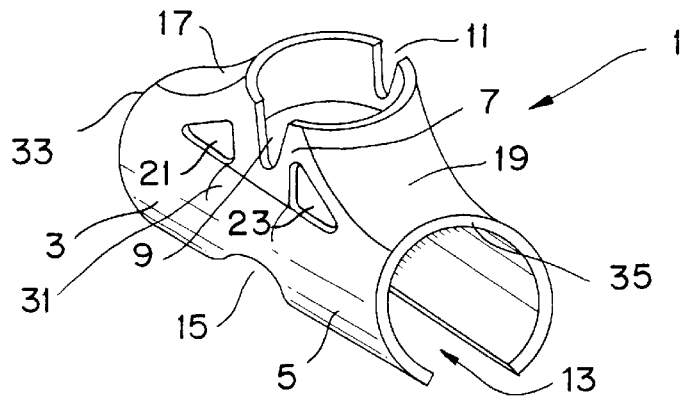
FIG. 1(a) is a perspective front view of the invention's preferred embodiment.

FIG. 1 (a) is a perspective front view of the invention's preferred embodiment. The cord shortening device is essentially a knot-tree shaped cord retaining housing device 1 having two aligned hollow interior legs 3 and 5 that perpendicularly intersect with a hollow interior leg 7. The upright leg 7 has two aligned opposite side cord retaining side housing grooves 9 and 11. Each of these cord retaining grooves 9 and 11 have an opened top and are tapered inwardly at their bottom. The top groove portion is approximately equal to the diameter or outer dimensions of the cord to be retained therein while the lower or bottom portion of each groove is substantially less than the outside diameter of the same cord. With this arrangement a cord pushed down into the tapered grooves will be held therein by virtue of a friction fit. Should the cord have elastic properties, such as in a bungee cord, once it is forced down into the grooves it will inherently expand to further increase the retention holding force on the cord in the groove.

The two lower aligned legs 3 and 5 having an elongated bottom slot 13 extending the complete length of both legs. At approximately their mid-portion where leg 3 is joined to leg 5 the bottom slot 13 has an enlarged opening 15 used to assist a user in placing the cord into and through the upper leg 7. Also shown in FIG. 1 (a) are the overlapping lower edges 33 and 35 of members 17 and 19, respectively, as further described with respect to FIG. 4.

Extending from the top portion of legs 3 and 5 to the leg 7 are two diagonally oriented supports 17 and 19. Open spaces 21 and 23 are formed between the side supports 17 and 19 and their adjacent respective intersecting legs 3/7 and legs 5/7. These two opened spaces 21 and 23 can be used to attach a two bungee cords as best shown in FIG. 1 (b). FIG. 1 (b) is a perspective front view showing the FIG. 1 (a) embodiment with two intersecting bungee cords having their ends engaged in a knot tee configuration and encircling a package. The first conventional bungee cord 37 engages the housing device 1 and has a formed loop end 47 as detailed with respect to the explanation of FIG. 5. The second intersecting conventional bungee cord 24 has opened hook free ends 26 and 28 that are each hooked into one of the formed opened spaces 21 and 23. In this manner the two bungee cords 24 and 37 are looped around the rectangular shaped package 30 and intersect at approximately a right angle. By having the two opposite hooked free ends of cord ends 26 and 28 of cord 24 so hooked into the device 1 which holds cord 37, the vertical movement of housing device 1 relative to cord 37 is restricted.

Figure 1B:
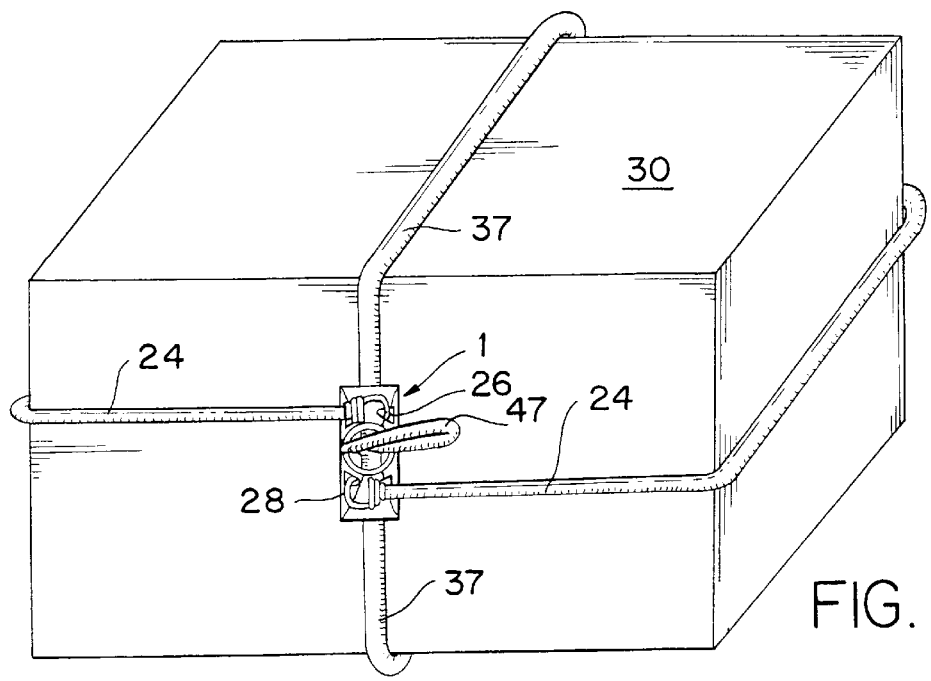
FIG. 1 (b) is a perspective front view showing the FIG. 1 (a) embodiment with two cords in a knot tee configuration encircling a package.
Figure 2:
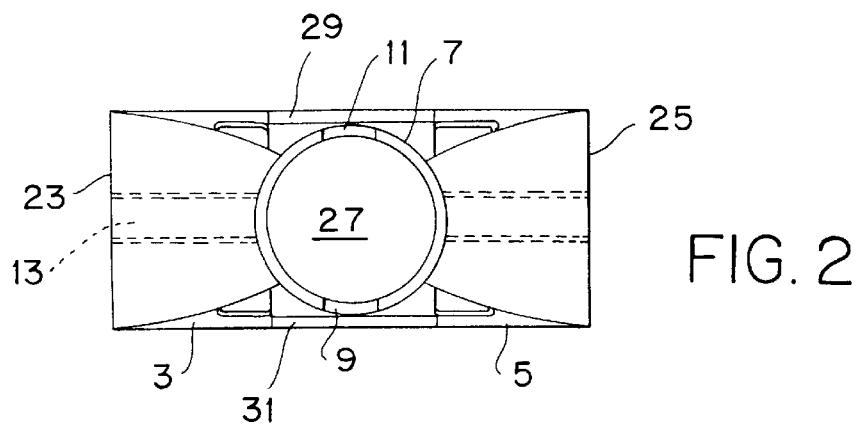
FIG. 2 is a top view of of the FIG. 1(a) preferred embodiment.

FIG. 2 is a top view of of the FIG. 1(a) preferred embodiment. The housing's two lower legs 3 and 5 each have formed hollow tubular shaped interior's that intersect and flow together to form a generally straight hollow interior tube like hole 25 which extends the length of the legs. The bottom portion of this formed hollow tubular shaped cut out portion intersects with the bottom slot 13 along the slot's length. Intersecting this hollow tubular hole or opening 25 at approximately a right angle is another hollow tubular hole 27 formed within the housing's leg 7. The enlarged midportion of bottom slot 13, slot portion 15, at its widest part is approximately the same diameter as the hollow tubular hole 27.

Figure 3:
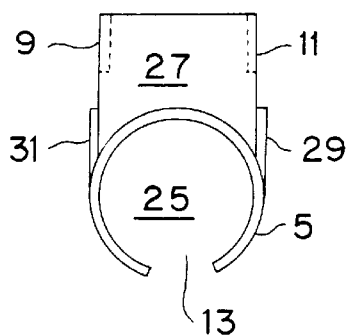
FIG. 3 is an end view of the device shown in FIG. 1(a).

FIG. 3 is an end view of the device shown in FIG. 1(a). In this view the bottom elongated slot 13 is shown intersecting the larger diameter hollow tubular shaped opening 25 which extends along and through both legs 3 and 5. At approximately its center the opening 25 intersects the upper opening 27 in leg 7 to form a cavity volume within the interior of the T-shaped housing with a similar shape. Two outside reinforcing side members 29 and 31 join upper leg 27 to aligned joined lower legs 3 and 5 where they are join together.

Figure 4:
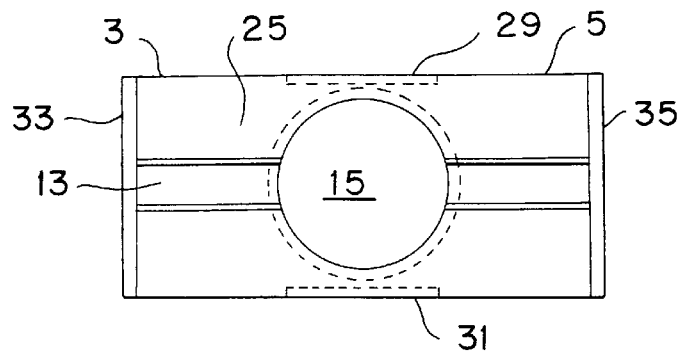
FIG. 4 is a bottom view of the FIG. 1(a) embodiment.

FIG. 4 is a bottom view of the FIG. 1(a) embodiment. In this view the enlarged portion 15 of elongated slot 13 is depicted as vertically aligned with the tubular cut out hole 27 of upper leg 7. Since portion 15 and cut out portion 27 are vertically aligned and have the same general dimensions only one is shown, it being understood the opened cut out hole 27 is directly behind hole 15. At the opened free ends of legs 3 and 5, the overlapping lower outer edges 33 and 35 of joined diagonal members 17 and 19, respectively, are just visible in this view. For clarity purposes, the location of these overlapping edges is also shown in FIG. 1 (a).

Figure 5:
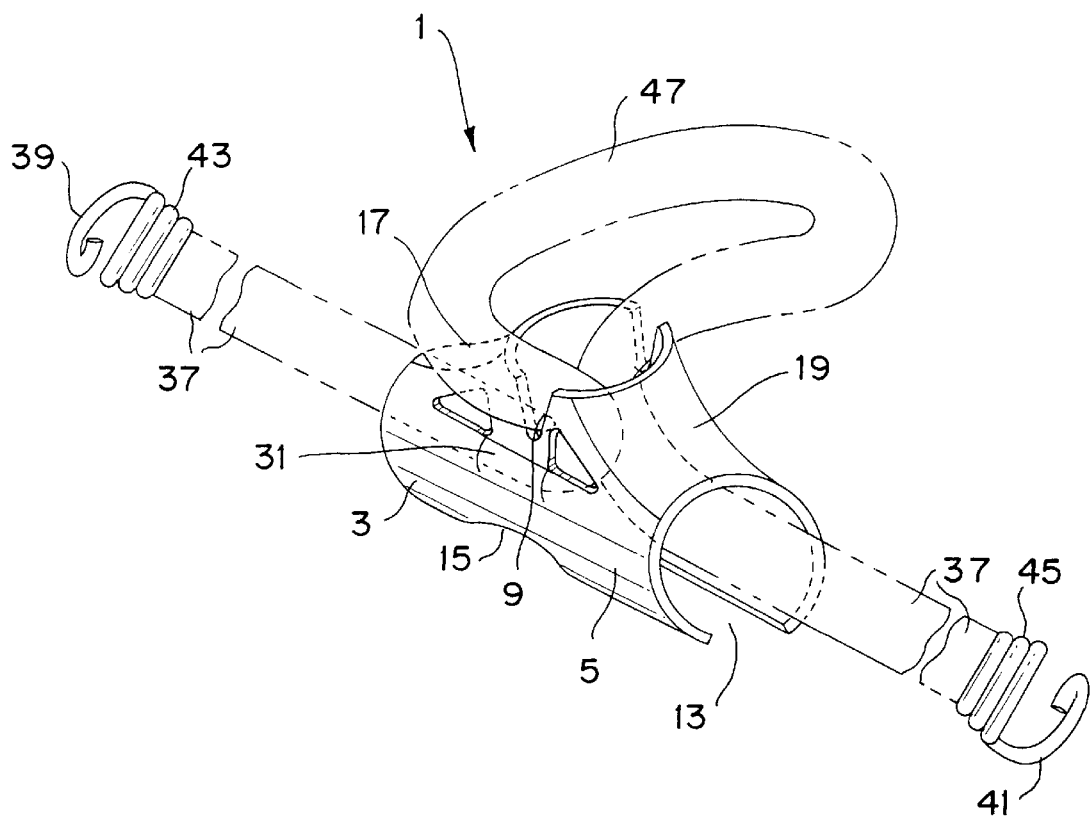
FIG. 5 depicts the FIG. 1(a) embodiment with a bungee cord shown in dotted line format retained therein.

FIG. 5 depicts the FIG. 1(a) embodiment with a bungee cord 37 shown in dotted line format retained therein. This conventional bungee cord 37 has two oppositely directed end hooks 39 and 41 firmly fixed to the cord's two ends by wound vinyl coated wires 43 and 45 forming part of the end hooks. Bungee cord 24, previously mention with respect to FIG. 1(b), has the same type of conventional construction.

To prevent the wound wires from being disengaged from the smaller diameter cord 37, each cord end is folded over itself and retained in that position by an encircling fastener. The thus formed enlarged cord ends with the wound wire ends 43 and 45 cannot easily be detached from the underlying main cord 37. The diameter of the main cord 37 is less than the diameter of the aligned hollow portion 25 but slightly greater than the width of slot 13 except for its enlarged lower slot opening 15. The lower enlarged opening 15 permits a user to insert a finger or other object therein to force a portion of the cord 37 into the upper hollow leg portion 27 (see FIG.2). Once the cord is forced through the top opened upper of leg 7, a user may then pull the exposed cord a distance approximately the amount of cord length they wish to shorten through the hollow leg 7 which then forms the shown (dotted line format) cord loop 47. Next, one of the lower edges of loop 47 is inserted into one of the two opposite side retaining grooves 9 or 11. Lastly, the cords free ends are pulled until the exact length desired is obtained and once obtained, the other lower loop end is inserted into the second groove (9 or 11) to firmly anchor the cord to the device 1.

The preferred embodiment for the cords 24 and 37 disclosed herein is an elastic bungee cord that under tension may be stretched several times is untensioned length and which then returns to its original length when the tension is removed. Conceivably, other types of cords, ropes and lines could use this invention to shorten their useful length for a particular purpose. Unless, explicitly stated to the contrary, the term "cord" as used in this specification includes any flexible elongated member whether it be call a cord, line, rope, wire, string elongated member, or any equivalent name.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. The combination of a cord shortening device and a flexible bungee cord comprising:

a first flexible elastic cord capable of having its length elongated by placing a tensioning force thereon and returning to its original length when the tensioning force is removed;

a generally T-shaped housing having a first leg, a second leg and a third leg with through openings extending through each leg, the first leg and the second legs having intersecting aligned through holes;

a third through opening in said third leg, said third opening intersecting the through holes in said first and second legs;

cord retaining means for said first elastic cord located in said third leg for retaining the cord inserted therein whereby a looped portion of the cord to be shortened is inserted into the third through opening and from the third leg until the desire length to be shortened is obtained;

a second flexible elastic cord having two opposite end fasteners, said second cord being capable of having its length elongated by placing a tensioning force thereon and returning to its original length when the tensioning force is removed; and said generally T-shaped housing having two opposite side supports that form opened spaces with and are fixed to said third leg, whereby the end fasteners of said second flexible elastic cord is insertable into the opened spaces of said third leg to restraint the movement of the cord shortening device.

2. A combined cord shortening device and flexible cord comprising:

a generally T-shaped housing having a first leg, a second leg and a third leg with through openings extending through each leg, the first leg and the second leg having intersecting aligned through holes;

a third through opening in said third leg, said third opening intersecting the through holes in said first and second legs;

said first leg and said second leg having lengths and being aligned along their lengths with each other, a slot extending along the aligned lengths of said first leg and said second leg, said slot having a width with an enlarged width portion located approximately at the slot's mid length portion;

cord retaining means located in said third leg for retaining a cord inserted therein whereby a looped portion of a cord to be shortened is inserted into the third through opening and from the third leg until the desire length to be shortened is obtained; and a flexible elastic cord whose length is to be shortened when inserted into said housing, said cord having a diameter greater than the width of the slot in the first leg and second leg except for said slot's enlarged width portion.

3. The cord shortening device as claimed in claim 2, wherein said enlarged slot portion is approximately the same size as the third through opening in the third leg.

* * * * *